May 18, 1965     C. A. BRATTON     3,184,253
ROLLER PUSHER CONNECTION FOR THE FRONT END OF A PUSHING TRACTOR
Filed Sept. 4, 1962

INVENTOR.
CHARLES A. BRATTON
BY
ATTORNEYS

United States Patent Office 3,184,253
Patented May 18, 1965

---

3,184,253
ROLLER PUSHER CONNECTION FOR THE FRONT END OF A PUSHING TRACTOR
Charles A. Bratton, 5961 Germaine Lane, La Jolla, Calif.
Filed Sept. 4, 1962, Ser. No. 221,248
2 Claims. (Cl. 280—481)

The present invention relates to pushing mechanism, and particularly to a roller which is used either as an element which is being pushed and in turn pushes a vehicle, or as an element on a tractor for pushing another vehicle.

For the purpose of illustrating the present invention, the pushing mechanism is shown on a vehicle which is being pushed as for example, by the pusher plate known in the trade as a "push bumper." In the embodiment illustrated, the vehicle being pushed is provided with the substantially horizontal and rearwardly extending bar structure or A-frame. The rear end of this frame carries an axle which also extends horizontally, but at right angles to the elongation of the frame. This axle carries a single roller.

Other features and the advantages of the present invention will be apparent from the following description, reference being had to the accompanying drawing wherein a preferred embodiment of the invention is illustrated.

In the drawing:

FIG. 1. is a fragmentary view of the rear end of a vehicle showing the present invention applied thereto, and also showing, a phantom, the pusher plate of a tractor.

Figure 1:
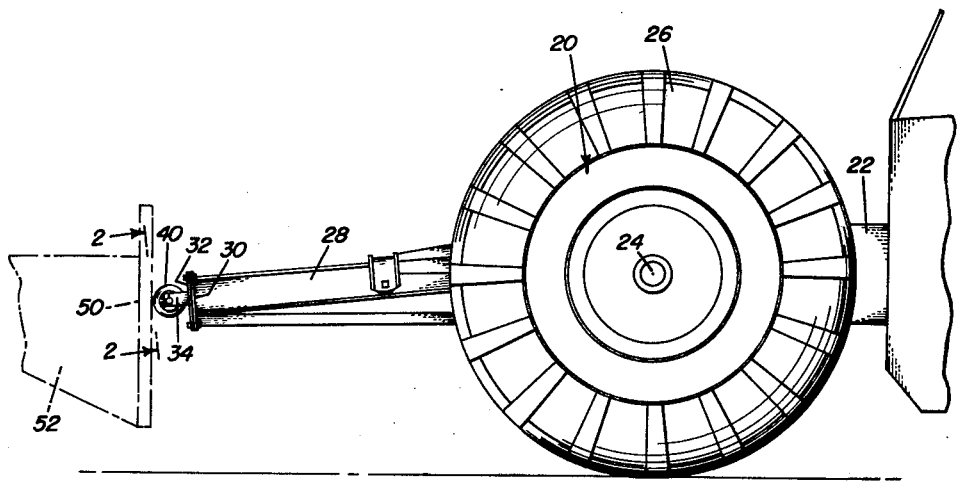
Figure 2:
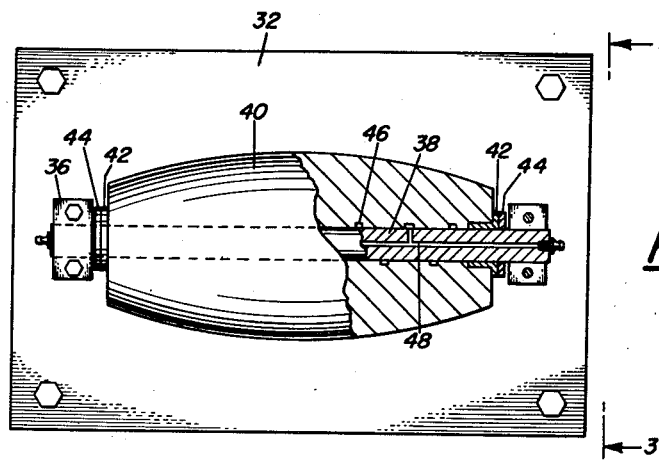
FIG. 2 is a view looking in the direction of arrows 2—2 of FIG. 1, but on a larger scale, part of the roller and the axle being shown in sections.
Figure 3:
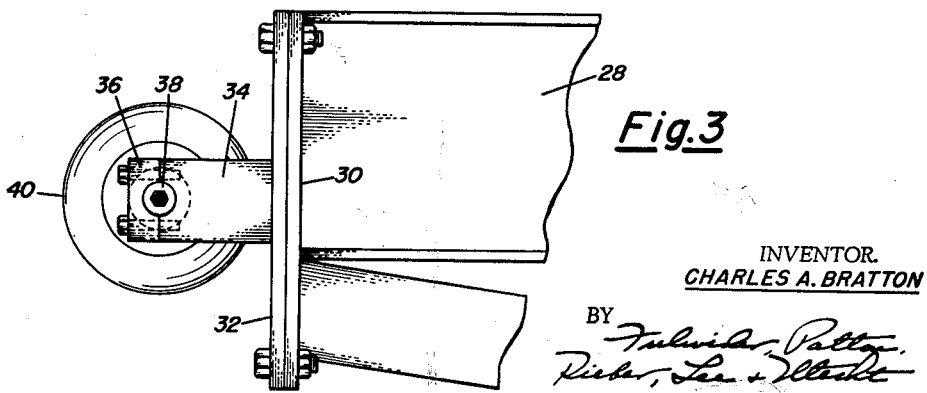
FIG. 3 is a fragmentary view looking in the direction of arrows 3—3 of FIG. 2.

Referring more in detail to the drawing, the element 20 may be either a tractor for pushing another vehicle, or may be a vehicle adapted to be pushed by a tractor. For the purpose of more clearly defining the invention, the vehicle 20 will be considered as one being pushed. Except for the elements shown more specifically in FIGS. 2 and 3, the vehicle 20 is of the standard type and includes a main frame 22, which carries an axle or axles 24 for a pair of aligned wheels 26.

Such standard structure also includes an A-frame 28. The rear end of this A-frame carries a vertically extending plate 30. A second plate 32 is secured to the rear side of plate 30. Two rearwardly extending bosses 34 are suitably carried by the rear of the rear plate 32. These bosses are horizontally aligned, which, together with caps 36, carry an axle 38. This axle extends horizontally and is disposed at right angles with respect to the direction of movement of the vehicle. The axle 38 carries a roller 40, which tapers to a larger diameter from opposite ends thereof. The roller carries graphite impregnated bushings 42, and wear washers 44 are interposed between the bushings 42 and the elements 34–36. Suitable lubricating grooves 48 are provided in the roller 40, and suitable lubricating grooves 50 are provided in the shaft 38.

The pushing plate of the tractor is shown in phantom at 50. It is carried by an A-frame 52 on the tractor.

From the foregoing it is apparent that by providing the roller 40, although a force applied by the tractor is not in direct alignment with the direction of forward movement of the vehicle 20, the roller will roll to such extent that the lifting force on the A-frame 28 is not of sufficient value to raise the rear wheels of the vehicle or the front wheels of the tractor off the ground, nor is the downward pushing force on the A-frame 28 of a value sufficient to lift the front wheels of the vehicle or the rear wheels of the tractor off the ground.

While the form of embodiment herein shown and described, constitutes preferred form, it is to be understood that other forms may be adopted falling within the scope of the claims that follow.

In the claims:
1. In combination:
   (A) a vehicle adapted to be pushed,
      (1) having means extending horizontally therefrom in a direction of normal movement of the vehicle,
         (a) a single axle arranged at right angles to said direction of normal movement and disposed horizontally from the end of said means,
         (b) bearings for supporting said axle,
         (c) and a roller carried by said axle, said roller tapering to a larger diameter from opposite ends to midway of the length thereof.
2. In combination:
   (A) a substantially vertically extending pusher plate of a pushing vehicle, such as a tractor;
   (B) a vehicle adapted to be pushed by the plate in a horizontal forward direction,
      (1) said vehicle having means extending horizontally and rearwardly therefrom,
         (a) a single axle arranged at right angles to said forward direction and disposed horizontally rearwardly from the rear end of said means,
         (b) bearings for said axle,
         (c) and a roller carried by said axle and adapted to be engaged by said pusher plate, said roller tapering to a larger diameter from opposite ends to midway of the length thereof.

References Cited by the Examiner
UNITED STATES PATENTS

| | | | |
|---|---|---|---|
| 1,754,934 | 4/30 | Capobianco | 293—17 |
| 1,774,656 | 9/30 | Miller | 280—481 X |
| 1,823,933 | 10/31 | Kegresse | 293—17 |
| 1,832,493 | 11/31 | Marsilius | 184—5 X |
| 2,886,343 | 5/59 | Pazik | 280—481 X |
| 2,646,287 | 7/63 | Kytola | 280—481 |

A. HARRY LEVY, *Primary Examiner.*
LEO FRIAGLIA, *Examiner.*